May 21, 1957   S. L. SHIVE   2,793,346
SIGNAL TRANSLATING CIRCUITS
Filed Aug. 28, 1953

INVENTOR.
SCOTT L. SHIVE
BY
Harry M. Saragovitz
ATTORNEY

_2,793,346_
_Patented May 21, 1957_

2,793,346

SIGNAL TRANSLATING CIRCUITS

Scott L. Shive, Little Silver, N. J., assignor to the United States of America as represented by the Secretary of the Army Application August 28, 1953, Serial No. 377,270

2 Claims. (Cl. 324—79)

(Granted under Title 35, U. S. Code (1952), sec. 266)

The invention described herein may be manufactured and used by or for the Government for governmental purposes without the payment to me of any royalty thereon.

This invention relates to improvements in signal translating circuits.

An object of the invention is to provide a new and improved circuit for detecting small amplitude sine wave signals accompanied by random noise currents of relatively high amplitude.

Another object of this invention is to accomplish the above without the introduction of intermodulation products which normally result from electrical non-linearity or rectification.

Still another object of the invention is to provide a new and improved circuit for demodulating a modulated sinusoidal carrier wave.

In accordance with one embodiment of the invention, the sine wave signal of known frequency masked by random noise currents, is applied to one coil of a dynamometer type of movement, and another sine wave of the same frequency is applied to the other coil of the dynamometer type of instrument.

In another embodiment of the invention, a modulated carrier wave is applied to one coil of a dynamometer type of transducer and another carrier wave of the same frequency as the modulated carrier wave is applied to the other coil of a transducer. The moving coil of the transducer may be connected to a diaphragm so that it functions as a loud speaker or, if more power is desired, to an electromechanical transducer and amplifier system.

The features of the invention, which are believed to be novel, are set forth with particularity in the appended claims. The invention itself, however, both as to its organization and method of operation, together with further objects and advantages thereof, may best be understood by reference to the following description taken in conjunction with the accompanying drawings, in which:

Figure 1:
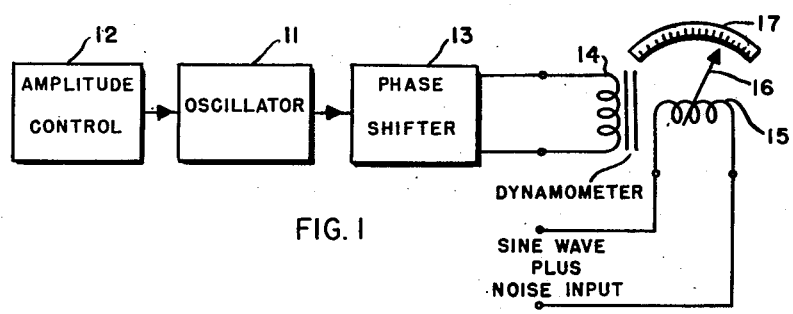
Fig. 1 is the schematic diagram of a circuit for detecting low amplitude sine wave signals from a wave containing random noise signals.

Referring now to Fig. 1, there is shown an oscillator 11 which may be crystal controlled or stabilized by any other means well known in the art. Means, not shown, are provided for adjusting the output frequency of said oscillator. The amplitude of the oscillator output may be controlled by means of a control 12 and the relative phase of the output adjusted by phase shifter 13. Fixed coil 14 and movable coil 15 comprise a transducer consisting of a dynamometer type of instrument movement. The dynamometer is shown schematically but is similar to the one illustrated in greater detail in Fig. 1 of Patent No. 2,402,719, of D. K. Allison, issued June 25, 1946. Pointer 16 is connected to the movable coil 15 and moves relative to a calibrated dial 17.

In operation, when it is desired to detect a sinusoidal signal of known frequency in a wave containing said signal masked by random noise components, the wave is applied to one of the two dynamometer coils, usually the movable coil 15. To the other coil 14 is applied a sinusoidal current of the frequency to be detected, and of sufficient amplitude to produce a relatively strong, alternating current field surrounding the moving coil. The torque on the moving coil is proportional to the product of the stationary coil current and the moving coil current multiplied by the cosine of the relative phase angle of the two currents. It can be shown that only the product of two sine waves of the same frequency has a constant term, whereas the product of two sine waves of different frequencies has no constant term. This is clear from the expression:

$$\sin^2 \theta = \tfrac{1}{2} - \frac{\cos 2\theta}{2}$$

which shows when two sine waves of the same frequency are multiplied there is a constant term, ½.

From the above, it is apparent that current flowing into the moving coil at any frequency other than that of the alternating field surrounding the moving coil produces no constant net torque. Hence, the noise voltage, even though many times greater than the signal voltage, has no net influence on the moving coil deflection except for the theoretically infinitely small component of noise voltage at the frequency of the sine wave to be detected.

Inasmuch as torque is proportional to the product of the two coil currents, and the stationary coil current may be made extremely large, the signal current to be detected in the movable coil may be correspondingly small and still be detectable. For maximum response, as indicated above, the wave output of the oscillator 11 must be in phase with the sine wave to be detected and this may be accomplished by means of adjustment of phase shifter 13.

The above described device performs the function of an extremely sharp filter which may be made to respond to a frequency band, only a small fraction of a cycle per second in width, depending on the damping and inertia of the meter movement. Moreover, the frequency response and sensitivity of the device may be altered instantaneously through wide ranges, merely by changing the frequency, phase, and amplitude of the current in the fixed coil.

Since the device may be made perfectly linear, the intermodulation products which normally result from introduction of electrical non-linearity or rectification into circuits containing several frequencies are not present, and no intermodulation products response masks the desired signal response.

Figure 2:
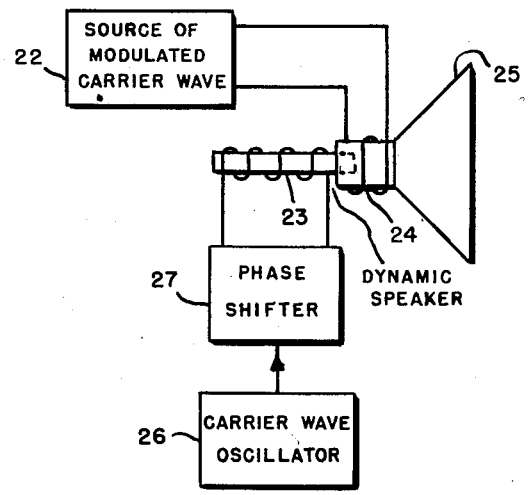
Fig. 2 is a schematic drawing of a translating circuit embodying the invention.

Figure 2 illustrates a translation circuit embodying the invention. It comprises a source of modulated carrier wave 22 feeding the movable coil 24 of a dynamometer type of transducer 23, 24, 25, which in the present case is a dynamic loud speaker. The fixed coil 23 of the transducer is fed by an oscillator 26, which generates oscillations at the carrier wave frequency. Between the oscillator and fixed coil, there is a phase shifter 27 for shifting the phase of the intermediate frequency oscillator output relative to that of the received carrier wave. The amplitude of the intermediate frequency oscillator may be adjusted by conventional means (not shown) and the output frequency thereof changed by other conventional means (not shown), both in the oscillator stage. Speaker cone 25 is connected to the movable coil 24.

Although the source of oscillations fed to the fixed coil of the transducer is shown in Fig. 2, as comprising a separate oscillator, there may be substituted for this oscillator a sharply tuned filter, such as a piezoelectric crystal, coupled to stage 22. This filter eliminates all modulation components of the carrier wave signal, and passes only the desired carrier wave. The output of the filter is applied to a limiter stage for providing waves of constant amplitude and, if necessary or desired, an amplifier stage for increasing the power of the wave, and then fed to the fixed coil.

The circuit illustrated in Fig. 2 detects directly and reproduces as sound the audio modulation of a radio frequency carrier. As shown, the modulated carrier current is made to flow through the moving coil of the transducer and a pure sine wave current of the same frequency as the carrier is made to flow through the stationary coil of the transducer. The movable coil responds to the product of the two currents which contains a direct current term varying in amplitude with that of the modulation signal. The alternating current terms of the product are radio frequencies above the audio range. Therefore, the moving coil drives the speaker cone only at the audio modulation frequency. Tuning of this device is accomplished by changing the frequency of the current fed to the fixed coil. For greater sensitivity, several tuned or untuned amplifying stages may be used ahead of the speaker detector but none of the random noise generated by such stages will appear in the speaker output.

Figure 3:
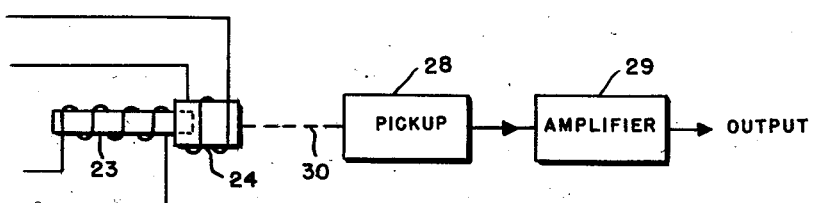
Fig. 3 is a schematic diagram of a modification of the circuit of Fig. 2.

Fig. 3 illustrates a modification of the circuit shown in Fig. 2 which is used where a greater degree of audio amplification is desired. Here, rather than being coupled to a loud speaker cone, the movable coil 24 of the transducer is coupled by a mechanical connection 30 to a pickup 28, which changes the mechanical movement of the coil 24 into an electrical signal. The pickup may comprise a crystal pickup or any other means well known in the art for converting mechanical movement into an electrical signal. The output of the pickup may then be amplified by amplifier 29 and fed to a signal translation circuit such as a loud speaker or any other device which it is desired to drive at the modulation frequency.

In all of the devices illustrated above, as has been previously mentioned, the torque or force on the moving coil depends on the phasing of the two currents. The torque may be varied from maximum to zero by changing the phase relationship of the currents in the coils by means of the phase shifters 13 (Fig. 1, and 27 (Fig. 2) from the optimum or perfectly in phase condition, to 90 degrees out of phase. Changing the phase by 180 degrees reverses the direction of the torque but maintains amplitude thereof the same.

The expression "dynamometer type transducer" as used herein, means an instrument having a fixed coil and a movable coil, wherein the torque exerted on the movable coil is proportional to the product of the current through the fixed coil and the current through the movable coil.

While there has been described what is at present considered the preferred embodiment of the invention, it will be obvious to those skilled in the art that various changes and modifications may be made therein without departing from the invention and it is aimed in the appended claims to cover all such changes and modifications within the true spirit and scope of the invention.

What is claimed is:

1. In combination with a source of sine wave carrier wave energy modulated with a signal and accompanied by noise wave energy, a signal translating circuit for detecting said modulated carrier wave modulated in accordance with a signal and accompanied by noise wave energy; comprising a dynamometer type product device, said device comprising a fixed coil, a movable coil positioned relative to said fixed coil to move in response to the interaction of the fields generated by said coils and signal reproducing means coupled to said movable coil; means for locally generating a wave synchronous in frequency with said carrier wave; means for applying said modulated carrier and noise wave energy to a one of said coils, means for applying said locally generated wave to the other of said coils and means for adjusting the phase and amplitude of said locally generated wave effectively to actuate said signal reproducing means in accordance with said signal and independently of said noise energy.

2. A signal translating circuit for detecting a carrier wave modulated in accordance with a signal and accompanied by noise wave energy; comprising a dynamometer type product device, said device comprising a fixed coil, a movable coil positioned relative to said fixed coil to move in response to the interaction of the fields generated by said coils and signal reproducing means comprising a diaphragm attached to said movable coil, said dynamometer and reproducing means being non-responsive to carrier current frequencies and responsive to modulation; means for locally generating a wave synchronous in frequency with said carrier wave; means for applying said modulated carrier and noise wave energy to a one of said coils, means for applying said locally generated wave to the other of said coils and means for adjusting the phase and amplitude of said locally generated wave effectively to actuate said diaphragm in accordance with said signal and independently of said noise.

References Cited in the file of this patent

UNITED STATES PATENTS

| | | |
|---|---|---|
| 1,641,693 | Price | Sept. 6, 1927 |
| 2,005,962 | Antranikian | June 25, 1935 |